(12) United States Patent
Han et al.

(10) Patent No.: US 6,896,709 B1
(45) Date of Patent: May 24, 2005

(54) MINIATURE FUEL REFORMER AND SYSTEM USING METAL THIN FILM

(75) Inventors: Jaesung Han, Taejon (KR); Cheolwoo Park, Taejon (KR); Keunseob Choi, Seoul (KR); Ilsu Kim, Taejon (KR)

(73) Assignee: Sk Corporation, Seoul (KR)

( * ) Notice: Subject to any disclaimer, the term of this patent is extended or adjusted under 35 U.S.C. 154(b) by 0 days.

(21) Appl. No.: 09/856,323

(22) PCT Filed: Sep. 7, 1999

(86) PCT No.: PCT/KR99/00524

§ 371 (c)(1),
(2), (4) Date: May 18, 2001

(87) PCT Pub. No.: WO00/31816

PCT Pub. Date: Jun. 2, 2000

(30) Foreign Application Priority Data

Nov. 19, 1998 (KR) .......................................... 98-049813

(51) Int. Cl.[7] .............................. B01J 8/02; C01B 3/50
(52) U.S. Cl. ....................... 48/127.9; 48/118.5; 48/128; 48/198.7; 422/191; 422/198; 422/211; 422/239
(58) Field of Search ........................... 48/61, 62 R, 89, 48/118.5, 119, 127.9, 128, 198.2, 198.3, 198.7; 422/110, 111, 188, 191, 198, 202, 204, 211, 234, 236, 239, 240

(56) References Cited

U.S. PATENT DOCUMENTS

| | | | | |
|---|---|---|---|---|
| 4,613,436 A | * | 9/1986 | Wight et al. ................. | 210/232 |
| 5,458,857 A | * | 10/1995 | Collins et al. ............... | 422/198 |
| 5,536,405 A | * | 7/1996 | Myrna et al. .......... | 210/321.75 |
| 5,639,431 A | * | 6/1997 | Shirasaki et al. ............ | 422/212 |
| 5,741,474 A | * | 4/1998 | Isomura et al. .......... | 423/648.1 |
| 5,861,137 A | | 1/1999 | Edlund ........................ | 423/652 |
| 5,888,273 A | * | 3/1999 | Buxbaum ....................... | 95/56 |
| 5,997,594 A | * | 12/1999 | Edlund et al. ................. | 48/76 |

FOREIGN PATENT DOCUMENTS

| | | | | |
|---|---|---|---|---|
| DE | 19738513 | | 11/1998 | ............ C25D/1/04 |
| EP | 0 600 621 | | 6/1994 | ............ C01B/3/48 |
| EP | 0 615 949 | | 9/1994 | ............ C01B/3/38 |
| EP | 0 924 162 | | 6/1999 | ............ C01B/3/32 |
| JP | 5-155602 | A | 6/1993 | ............ C01B/3/38 |
| JP | 5-155602 | * | 6/1993 | ............ C01B/3/38 |
| JP | 6-168733 | A | 6/1994 | ............ H01M/8/06 |
| JP | 8-321321 | A | 12/1996 | ............ H01M/8/06 |
| WO | 98/13125 | | 4/1998 | ........... B01D/53/22 |
| WO | 99/19456 | | 4/1999 | ............ C12F/5/00 |

* cited by examiner

Primary Examiner—Kevin P. Kerns
(74) Attorney, Agent, or Firm—Drinker Biddle & Reath LLP

(57) ABSTRACT

A miniature fuel reformer utilizes a metal thin film and includes a plurality of unit modules connected together. Each module has a cylindrical inner housing with top and bottom walls defining a hydrogen separation reaction chamber, an outer housing surrounding and radially spaced from the inner housing, a combustion catalyst chamber between the inner and outer housings, a fuel inlet at the inner housing top wall, a plurality of vertically spaced hydrogen gas separation cells arranged in the reaction chamber, a steam reforming catalyst in the reaction chamber between adjacent hydrogen gas separating cells, a plurality of vertically spaced cylindrical support members centrally arranged in the reaction chamber while defining a hydrogen passage communicating with the hydrogen separation cells, a permeate discharge tube coupled to the inner housing bottom wall, a plurality of raffinate outlets in the inner housing bottom wall, and a plurality of combustion fuel/air inlets respectively connected to the raffinate outlets.

7 Claims, 6 Drawing Sheets

MINIATURE FUEL REFORMER AND SYSTEM USING METAL THIN FILM

BACKGROUND OF THE INVENTION

1. Field of the Invention

The present invention relates in general to a fuel reformer utilizing a metal thin film for use in a fuel cell driven mobile vehicle which makes use of, as a fuel, an alcohol such as methanol, ethanol, etc. More particularly, the invention relates to a miniature fuel reformer and a system thereof for use in a fuel cell driven mobile vehicle, which enables a reduction in size by adopting an integrated hydrogen generation/separation device in which the steam reforming reaction for the hydrogen generation, and the separation reaction for the hydrogen separation, are carried out simultaneously in the same reactor. The invention utilizes by the metal film property which selectively permeates only hydrogen of a reforming gas containing hydrogen, and by the principle by which the reaction rate increases beyond its equilibrium limit.

2. Description of the Prior Art

In general, a fuel cell system by which chemical energy converts directly to electric energy by a chemical reaction between a hydrogen gas and an electrolyte, is used where internal combustion engines are not substantially utilized, such as in the case of spaceship. Fuel cell systems are also used for supplying electric power to electric driven mobile vehicle. In particular, in recent years, the importance of the fuel cell system is increasingly highlighted due to the tightening of restrictions on air pollution, and the limitation of the development of electric vehicles using battery power.

Moreover, with increasing interest in energy efficiency and the environmental pollution problem, it is accepted that internal combustion engine driven vehicles can be virtually replaced with electric vehicles using fuel cells. However, there are various technical limiting factors that need still to be resolved, before these fuel cell driven vehicles can be widely commercially available. In particular, in a fuel cell driven vehicle that uses hydrogen gas as a fuel, all the problems associated with the construction of infrastructure for the storage, delivery, and supply of the hydrogen fuel act as limiting factors in the wide utilization of such vehicles.

Recent progress has been made in the development of a fuel reformer, wherein a liquid fuel such as methanol, ethanol, gasoline, and the like is reformed to generate hydrogen, which is then separated for utilization as a fuel. However, in order for such a fuel reformer to be widely utilized, developing a fuel reformer having smaller size, lighter weight, and excellent response to load is necessary. Particularly significant is that the fuel reformer is made smaller and lighter so that it can be mounted on the vehicle.

A Solid Polymer Electrolyte Fuel Cell (hereinafter, called "SPEFC") has been used in recent fuel cell vehicles. The SPEFC, however, has a shortcoming in that it easily loses its activity by virtue of CO contained in hydrogen gas, that is, the fuel. For this reason, it is significant to lower the concentration of CO to a minimum.

Figure 1:
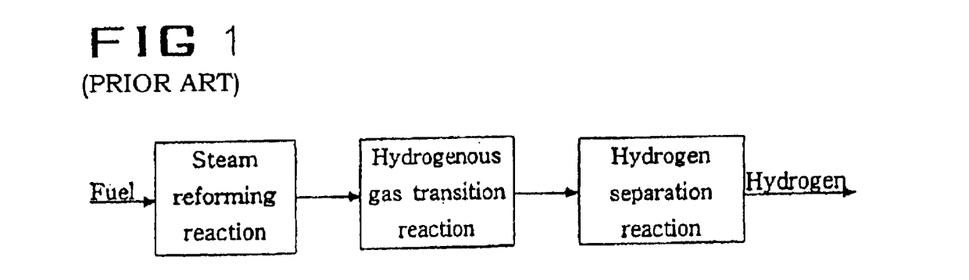
FIG. 1 is a block diagram schematically showing the steam reforming reaction and the hydrogen separation reaction separately carried out with the prior art fuel reforming system.

Furthermore, to develop a fuel cell vehicle using a liquid fuel, thereby resolving the above described problems with respect to the use of hydrogen gas fuel, a process for preparation of hydrogen that utilizes the prior art steam reforming reaction has been developed worldwide. However, this technology has a problem in decreasing the total size of the fuel reformer system, because the steam reforming reaction and the hydrogen separation reaction are carried out in different reactors as shown in FIG. 1.

For example, in U.S. Pat. No. 4,613,436, an effort has been made to decrease the size of a hydrogen separation apparatus by arranging a plurality of vertically spaced circular hydrogen separation membranes while interposing airtight protrusions between adjacent membranes such that spaces defined between adjacent membranes by the airtight protrusions are isolated from one another. The reforming gas flow is passed through each of the hydrogen separation membranes to separate hydrogen, which is then captured. However, the structure of this hydrogen separation apparatus is very unsuitable for mass production, and also has difficulty in maintaining airtightness at its fixed portions. To resolve these problems, U.S. Pat. No. 5,536,405 proposes inserting gaskets between the hydrogen separation membranes during the arrangement of the membranes such that the resultant apparatus may be suitable for mass production, and such that airtightness may be easily maintained between the hydrogen separation membranes. A drawback of the apparatus in the latter patent, however, is its heavy weight due to the application of the gasket means.

Meanwhile, an attempt to improve the performance of the fuel reformer has been made. U.S. Pat. No. 5,458,857 attempted to carry out, in separate regions, hydrogen gas generation by the endothermic steam reforming of methane, and the exothermic transition reaction for transition of carbon monoxide and steam to carbon dioxide and hydrogen, so as to improve the efficiency of the fuel reformer, thereby realizing the miniaturization of the fuel reformer. However, the problems associated with this patent are that the necessary heat cannot be supplied by the heat from the transition reaction alone, and that the structure of the fuel reformer is complicated such that the efficiency is decreased. Furthermore, U.S. Pat. No. 5,741,474 attempted to simultaneously practice, in a certain space, the partial oxidation of methane, as an exothermic reaction, and the reforming reaction, as an endothermic reaction, thereby maximizing the heat transfer efficiency. However, there is a drawback in that both reactions cannot be efficiently controlled, thereby reducing the performance of the fuel reformer. Japanese Patent Application No. 93-147902 attempted to supply the necessary heat for the reaction by re-using, as a fuel, some of the hydrogen generated by the reaction of methanol with water, so as to improve the performance of the fuel reformer, and to miniaturize the fuel reformer as well. However, there is a problem in this design in that a separate device is necessary for initial heating, thereby limiting the miniaturization of the fuel reformer.

The above described inventions are characterized by limitations on performance improvement and fuel reformer miniaturization, because improvement in performance and miniaturization have been based on improvement of the fuel reformer structure, without resolving the prior art problem that the fuel reformer and the hydrogen separation apparatus must be separately present.

In an attempt to overcome such limitations, U.S. Pat. No. 5,888,273 discloses a hydrogen generation device in which a long tube-shaped membrane for separation of hydrogen and a steam reforming catalyst are positioned in the same space. Hydrogen gas is separated, and some of the reforming gases, containing hydrogen, carbon monoxide, carbon dioxide, steam, etc., are transported to a separate location, and then are burned, thereby supplying the necessary heat for the reforming. However, such a device is problematic in that initial ignition is difficult. Another problem is that the heat transfer efficiency of the device in supplying the necessary initial heat for the start of the reforming reaction, and heat for maintaining the necessary membrane temperature for the permeation of hydrogen, is poor. These problems are considered significant drawbacks against the fast initial starting period and dynamic response of the fuel cell driven vehicle. In addition, because of the complicated structure and the use of the long tube-shaped hydrogen separation membrane, the hydrogen generation device of U.S. Pat. No. 5,888,273 is unsuitable in mass production processes, such as in the manufacturing of vehicles.

SUMMARY OF THE INVENTION

It is therefore an object of the present invention to provide a miniature fuel reformer in which a metal thin film selectively permeating only hydrogen from a fuel is utilized to lower, to a very low degree, the concentration of carbon monoxide (CO) contained in the hydrogen fuel supplied to an anode of a SPEFC, thereby remarkably reducing the poisoning of the anode by carbon monoxide.

It is another object of the present invention to provide a miniature fuel reformer in which unit modules are connected with each other in series, parallel, or a combination thereof, thereby supplying, in a suitable way, a necessary amount of hydrogen to a vehicle.

Figure 2:
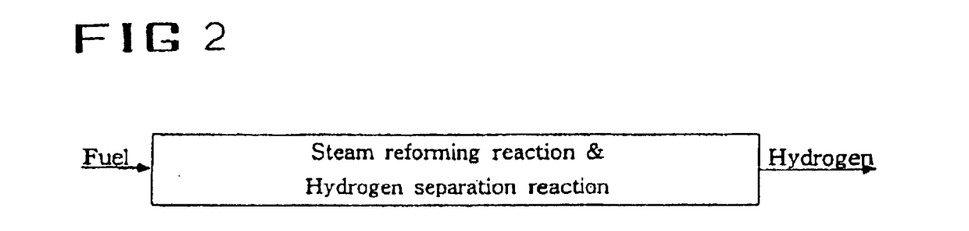
FIG. 2 is a block diagram schematically showing the steam reforming reaction and the hydrogen separation reaction carried out in the same reactor with a fuel reformer according to the present invention.

It is another object of the present invention to provide a unit module in which a reaction for reforming a liquid fuel and a reaction for separation of hydrogen are carried out in the same reactor as shown in FIG. 2, thereby providing a miniaturized fuel reforming system that can be easily mounted within a fuel cell driven vehicle.

To accomplish the above objects, the present invention provides a miniature fuel reformer for use in a fuel cell driven vehicle comprising a plurality of unit modules connected with each other in series, parallel, or a combination thereof, each of the unit modules including: an inner housing having a cylindrical shape and top and bottom walls; an outer housing arranged around the inner housing and being radially spaced from the inner housing; a hydrogen separation reaction chamber defined in the inner housing; a combustion catalyst chamber defined between the inner and outer housings and containing a combustion catalyst for supplying heat needed in the inner housing; a fuel inlet provided at the top wall of the inner housing and adapted to introduce liquid fuel into the hydrogen separation reaction chamber; a plurality of vertically spaced hydrogen gas separation cells arranged in the hydrogen separation reaction chamber and adapted to selectively permeate hydrogen contained in the fuel introduced in the hydrogen separation reaction chamber, thereby separating the hydrogen from the fuel; a steam reforming catalyst filling the hydrogen separation reaction chamber between adjacent hydrogen gas separation cells and adapted to reform the fuel introduced in the hydrogen separation reaction chamber; a plurality of vertically spaced cylindrical support members centrally arranged in the hydrogen separation reaction chamber while defining a hydrogen passage communicating with the hydrogen gas separation cells, thereby allowing the hydrogen separated from the fuel to be discharged from the hydrogen gas separation cells, each of the cylindrical support members being interposed between adjacent hydrogen gas separation cells and serving to regulate a gap defined between the adjacent hydrogen gas separation cells; a permeate discharge tube coupled to the bottom wall of the inner housing, the permeate discharge tube communicating with the hydrogen passage defined by the cylindrical support members to allow the hydrogen introduced in the hydrogen passage to be outwardly discharged from the hydrogen passage; a plurality of raffinate outlets provided at the bottom wall of the inner housing and adapted to discharge a portion of the fuel, which does not permeate through any one of the hydrogen gas separation cells, from the hydrogen separation reaction chamber; and a plurality of combustion fuel/air inlets respectively connected to the raffinate outlets by conduits and adapted to introduce the fuel portion discharged from the raffinate outlets into the combustion catalyst chamber, along with air, so that the fuel portion is burned in the combustion catalyst chamber.

Moreover, the present invention provides a miniature fuel reforming system for use in fuel cell driven vehicles, comprising: a fuel preheater for preheating and vaporizing a liquid fuel; a fuel reformer for receiving the vaporized fuel via a fuel supply header and separating hydrogen from the received fuel to produce a reforming gas, the fuel reformer having a hydrogen separation reaction chamber for separating hydrogen from the received fuel, and a combustion catalyst chamber containing a combustion catalyst for supplying heat needed in the hydrogen separation reaction chamber, the combustion catalyst chamber receiving the hydrogen-separated fuel, that is, a raffinate; means for receiving a permeate, that is, the hydrogen separated by and discharged from the hydrogen separation reaction chamber of the fuel reformer, via a permeate header, controlling the pressure of the received permeate, and supplying the pressure-controlled permeate to an anode of a fuel cell; means for controlling the pressure of the raffinate discharged from the hydrogen separation reaction chamber, thereby controlling the hydrogen separation reaction chamber of the fuel reformer; and valve means for supplying the raffinate to the combustion catalyst chamber of the fuel reformer.

BRIEF DESCRIPTION OF THE DRAWINGS

The foregoing and other objects, features and advantages of the invention will be apparent to those skilled in the art to which the present invention relates from reading the following specification with reference to the accompanying drawings, in which:

FIGS. 5 and 6 also show a raffinate composed of hydrogen that is not permeated through the cell.

DESCRIPTION OF THE PREFERRED EMBODIMENTS

Figure 3:
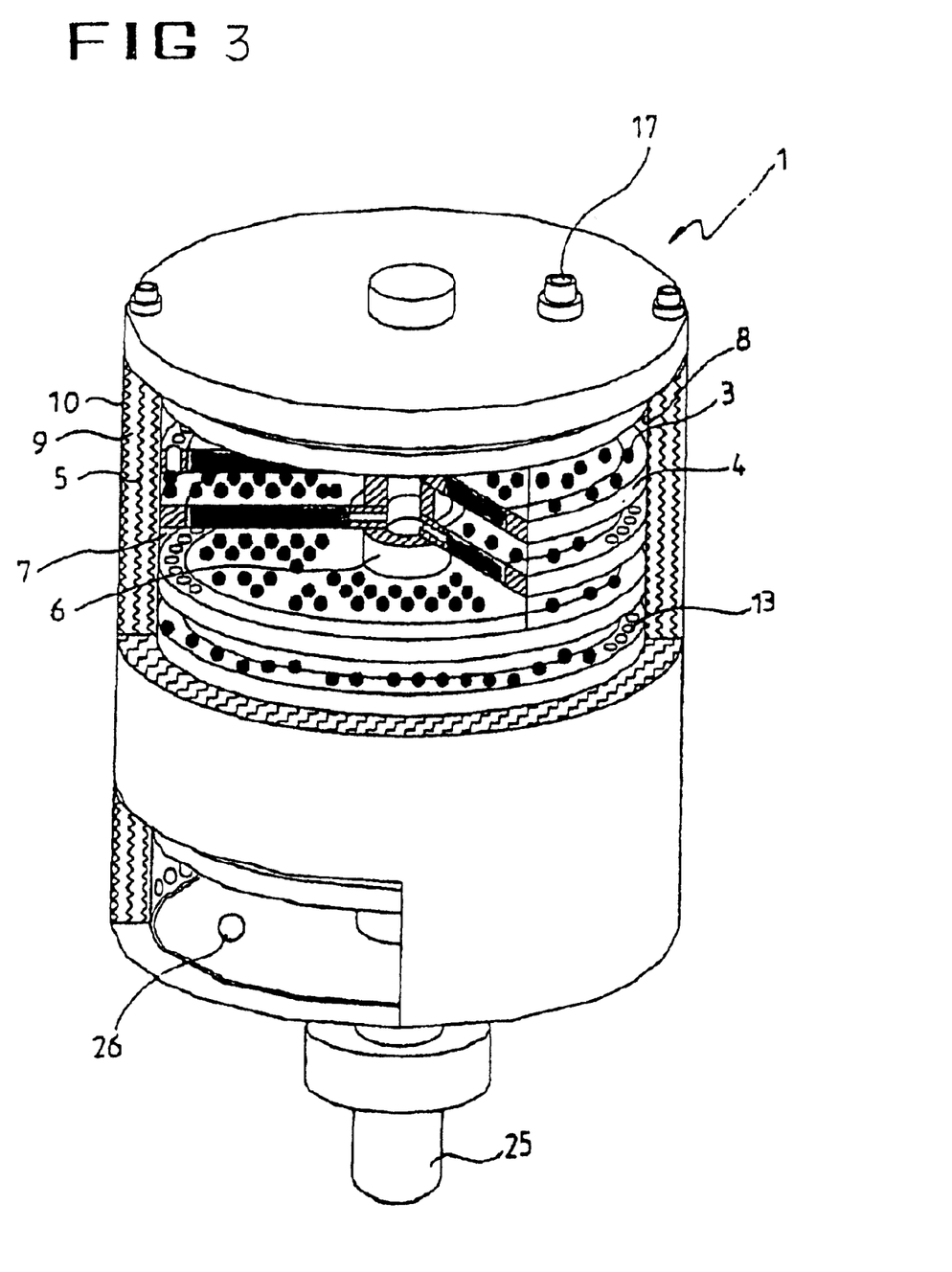
FIG. 3 is a schematic view of the construction of a unit module of a fuel reformer according to the invention.

FIG. 3 schematically shows the construction of a unit module 1 included in a miniature fuel reformer for a fuel cell driven vehicle according to the invention.

A plurality of the unit modules 1 are connected in series, parallel, or a combination thereof with each other, to constitute the fuel reformer of the invention. The unit module 1 has a fuel inlet 17 which is formed on its upper end into which a liquid fuel, for example, alcohol such as methanol, ethanol, etc., is introduced. Moreover, the unit module 1 has a hydrogen separation reaction chamber 7. A steam reforming catalyst 3 is contained in the hydrogen separation reaction chamber 7, which serves to reform the fuel introduced through the fuel inlet 17. The hydrogen separation reaction chamber 7 also contains therein a plurality of vertically spaced hydrogen gas separation cells 4 for permeating and separating only hydrogen from the reforming gas. The hydrogen separation reaction chamber 7 is defined by an inner housing 8 having a cylindrical shape and top and bottom walls. Interposed between adjacent hydrogen gas separation cells 4 are a plurality of vertically spaced cylindrical support members 6 fixed to the cells 4 at both ends thereof 6 a diffusion welding process. These cylindrical support members 6 are centrally arranged in the hydrogen separation chamber 7 to define a hydrogen passage communicating with the hydrogen separation cells 4, thereby allowing the hydrogen separated from the fuel to be discharged from the hydrogen gas separation cells 4. The cylindrical support members 6 also serve to control a gap defined between the adjacent cells 4. A combustion catalyst chamber 9 is arranged around the inner housing 8. The combustion catalyst chamber 9 has a combustion catalyst 5 for transferring the necessary heat to the hydrogen separation reaction chamber 7. Combustion catalyst chamber 9 is defined between the inner housing 8 and an outer housing 10 arranged around the inner housing 8.

A permeate discharge tube 25 is coupled to the bottom wall 1 of the inner housing 8. Permeate discharge tube 25 also communicates with the hydrogen passage defined by the cylindrical support members 6 to allow the hydrogen introduced into the hydrogen passage to be outwardly discharged from the passage. Meanwhile, in order for a raffinate (a reforming gas not permeated through the hydrogen gas separation cells), to discharge from the hydrogen separation reaction chamber, a plurality of raffinate outlets 26 are formed at an inclined bottom wall of the inner housing 8. In addition, although not shown in FIG. 3, a plurality of combustion fuel/air inlets are connected to the raffinate outlets by conduits. These combustion fuel/air inlets are adapted to introduce the fuel portion discharged from the raffinate outlets 25 into the combustion catalyst chamber 9, along with air, so that the fuel portion is burned in the combustion catalyst chamber 9.

Each of the hydrogen gas separation cells 4 includes one or more channels 13 at its peripheral portion to allow the fuel to flow therethrough.

Figure 4:
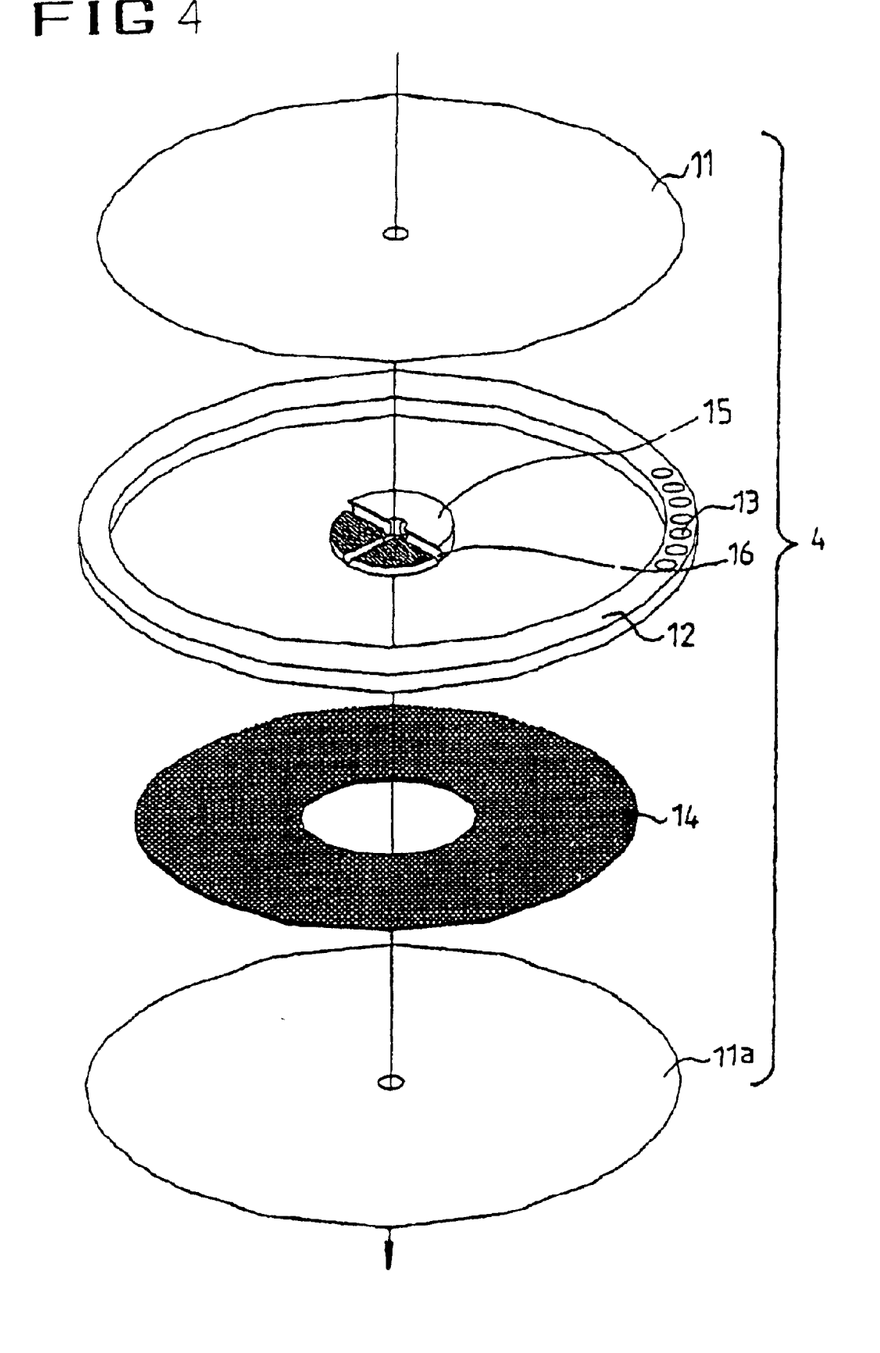
FIG. 4 is a schematic view of the construction of a hydrogen gas separation cell according to the invention, that permeates hydrogen from a reformed gas containing hydrogen.

The construction of each of the hydrogen gas separation cells will now be described in detail with reference to FIG. 4. Each hydrogen gas separation cell 4 comprises a pair of spaced metal films 11 and 11a adapted to selectively separate only hydrogen, and an annular support plate 12 made of copper or a copper alloy. Support plate 12 is provided at its peripheral portion with one or more vertical fuel channels 13. The support plate 12 is attached to the metal films 11 and 11a at opposite surfaces thereof, and therefore supports the metal thin films 11 and 11a. The hydrogen gas separation cell 4 also includes a support layer 14 (a porous separation membrane) serving to provide a passage for hydrogen permeated through the metal film 11 while maintaining structural stability of the hydrogen gas separation cells 4. A central support disk 15 made of copper or a copper alloy is provided with a central hole (denoted by no reference numeral) and at least one radial hole 16. The radial hole 16 extends radially throughout the diameter of the central support disk 15 while communicating with the central hole formed at the central support disk 15 in such a fashion that permeate (hydrogen permeated through the metal films 11 and 11a), passes therethrough. Also, the central hole communicates with the hydrogen passage defined by the cylindrical support members 6.

Moreover, in order to prevent a degradation in the hydrogen separation performance of the steam reforming catalyst 3 by a direct contact of the steam reforming catalyst 3 with the metal film 11, a layer, which may be the support layer 14, is disposed between the steam reforming catalyst 3 and the metal film 11. Preferably, the support layer 14 is made of a porous separation membrane.

In such a hydrogen gas separation cell 4, hydrogen in the reforming gas generated by reforming the fuel with the steam reforming catalyst 3 is adsorbed onto an outer surface of the metal film 11 and separated from the fuel. The separated hydrogen atoms are permeated through the metal film 11 and then are bonded into hydrogen molecules at an inner surface of the metal film 11. The hydrogen molecules are passed through the radial hole and central hole formed at the central support disk 16 and then discharged from the hydrogen separation reaction chamber 7 through the permeate discharge tube 25.

In such a hydrogen selective-separation reaction, a higher pressure differential between the inner surface and the outer surface of the metal film 11, as well as a higher surface temperature, result in an increased permeation performance of the metal film 11. In addition, it is necessary to keep the surface of the metal film 11 clean for better permeation performance of the metal film. The metal films 11 and 11a used in the invention include films made of palladium-based alloy, such as Pd-Cu based alloy or Pd-Ag based alloy, and a metal films or metal foils made of vanadium (V), nickel Ni or an alloy thereof coated with palladium.

The steam reforming catalyst 3 useful in the invention includes a steam reforming catalyst based on Cu-Zn alloys, as well as a steam reforming catalyst containing precious metals such as Pt, in the amount of at least 0.01% by weight.

Furthermore, the hydrogen production capacity of the respective unit modules 1 in the fuel reformer can be varied freely depending on the surface area of the respective metal film 11, and the amount of the steam reforming catalyst 3 being filled. This allows the capacity of the modules to be freely regulated. Namely, the amount of the steam reforming catalyst 3 filled can be varied depending on the height of the respective cylindrical support members 6, and the surface area of the metal film 11 can be varied with the diameter of the support plate 12. Accordingly, the hydrogen production capacity of the respective unit modules in the fuel reformer can be freely determined depending on the surface area of the respective metal film 1, and the amount of the steam reforming catalyst 3.

The support plate 12 supporting the metal films 11 and 11a, and the central support disk 15, are connected with each other by diffusion welding such that there is no gap between the inside and the outside of the respective hydrogen gas separation cells 4. Therefore, the concentration of other reforming gases poisonous to the fuel cell stack, particularly carbon monoxide, is very low, thereby maintaining the performance of the fuel cell stack for a longer time.

As described above, it is preferable that the fuel channels 13 formed at the peripheral portion of the support plate 12 are arranged in a zig-zag pattern as shown in FIG. 3, when connecting the respective hydrogen gas separation cells 4 with the cylindrical support members 6. This provides an increase in the contact efficiency between the fuel and the steam reforming catalyst 3, as well as an increase in the contact efficiency between the reforming gas and the metal film 11.

Figure 5:
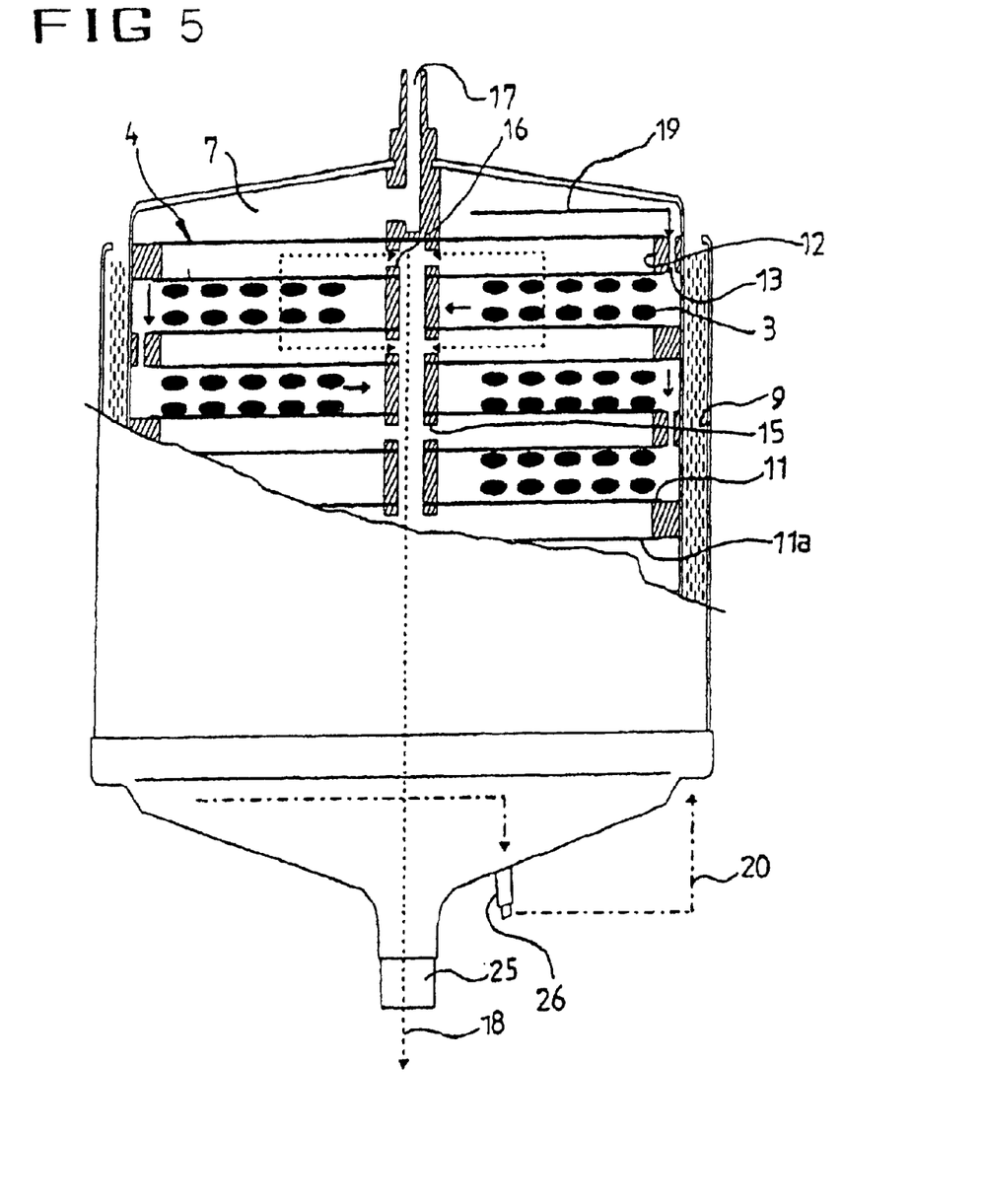
FIG. 5 and FIG. 6 are schematic views, showing passages for a fuel for steam reforming, and for a permeate composed of hydrogen permeated through a hydrogen gas separation cell.
Figure 6:
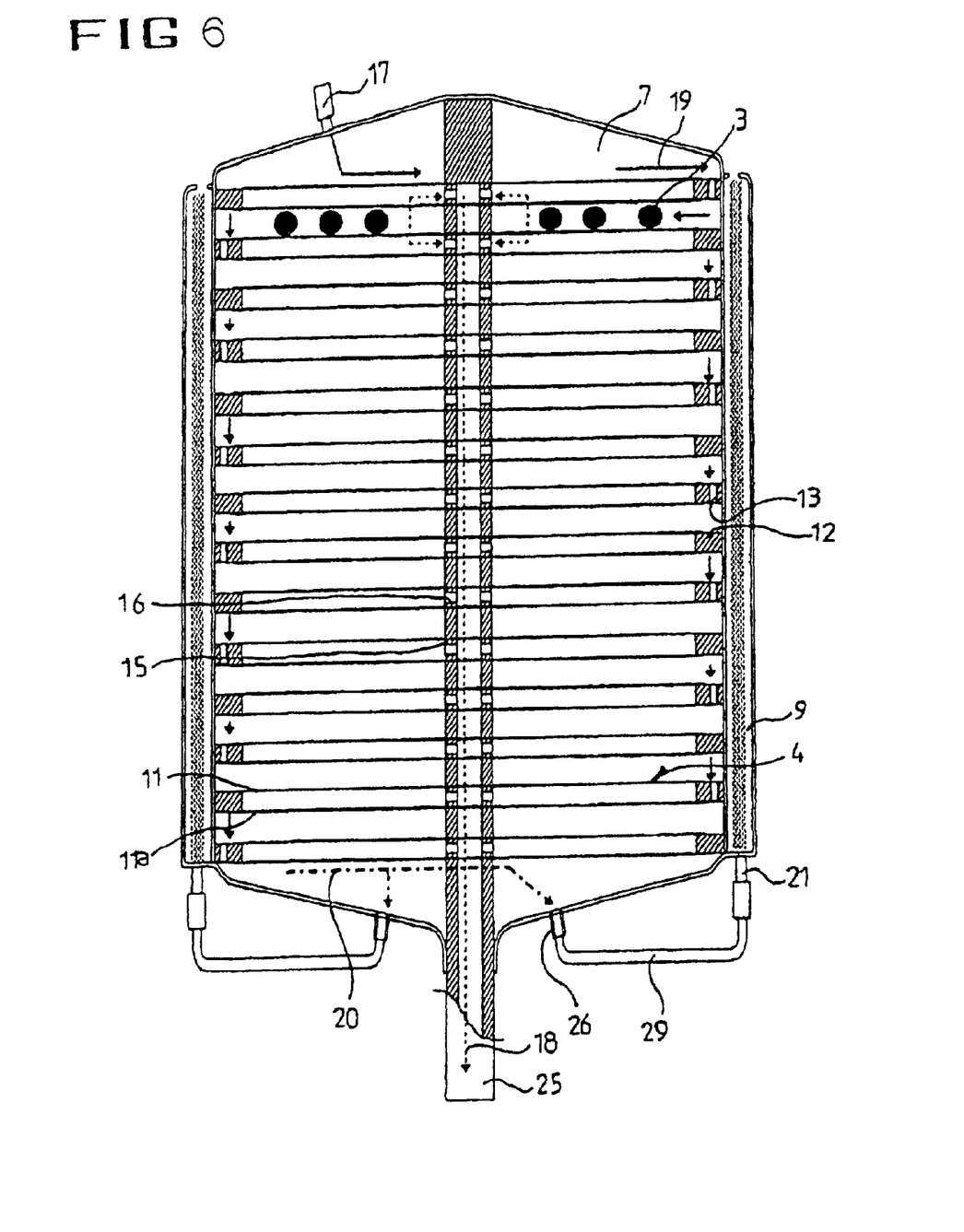

Referring to FIGS. 5 and 6, various passages and a reaction process will now be described. In FIGS. 5 and 6, arrows shown as solid lines depict a fuel passage 19, arrows shown as dotted lines depict a permeate passage 18, and arrows shown as one dot chain lines depict a raffinate passage 20.

A fuel, for example, alcohol such as methanol, ethanol, etc., that is pre-vaporized by a fuel preheater (not shown) disposed outside of the fuel reformer, is introduced into the hydrogen separation reaction chamber 7 through the fuel inlet 17 formed at the top wall of the inner housing 8. The introduced fuel is heated with combustion heat from the combustion catalyst chamber 9 to a temperature in the range of from 150° C. to 600° C. that is the temperature required by the hydrogen separation reaction chamber 7. The heated fuel flows downwardly to the hydrogen gas separation cells 4 through the fuel channels 13 formed at the peripheral portion of the support plate 12 of the respective cells 4, while contacting the steam reforming catalyst 3 filled therebetween. The fuel contacting the catalyst 3 is subjected to the reforming reaction as indicated in the following reaction scheme, to convert it into a reforming gas essentially consisting of hydrogen, carbon dioxide, and the remainder of water:

$$CH_3OH + H_2O \rightarrow CO_2 + 3H_2 \rightarrow \Delta H_{298} = 130.99 \text{ KJ}$$

The reforming gas is then contacted with the metal film 11 that is connected to the support plate 12 by diffusion welding. Only hydrogen from the fuel is selectively permeated through the metal films 11 and 11a. The hydrogen is passed through the radial hole 16 formed at the central support disk 15, and discharged from the permeate discharge tube 25. Moreover, a raffinate that represents reformed gas not permeated through the hydrogen gas separation cells 4 is discharged through raffinate outlets 26 formed along an inclined bottom wall of the inner housing 8. The raffinate is passed through conduits 29 and the combustion fuel/air inlets 21, and then introduced into the combustion catalyst chamber 9.

The steam reforming reaction as indicated in the above reaction scheme is an endothermic reaction for which much heat is necessary. It is preferable that the necessary heat for the endothermic steam reforming reaction is obtained by a heat exchange with the combustion heat. For such a heat exchange, methods may be used wherein a fuel stream supplied to the hydrogen separation chamber 7 and a fuel stream supplied to the combustion catalyst chamber 9 are cocurrent flows, or wherein both streams are countercurrent flows. However, the latter method is preferred for an increases in heat efficiency by more effective heat exchange. Namely, in the raffinate being discharged from the hydrogen separation chamber 7 without permeating through the hydrogen gas separation cells 4, contains hydrogen in the range of 1 to 70% by weight the amount varies depending on operation conditions of the hydrogen separation reaction chamber 7. Accordingly, where the raffinate is used as a fuel in the combustion catalyst chamber 9, there is no need for the supply of a separate fuel. This can further improve the energy efficiency of the fuel reformer.

The above-described unit modules are connected to each other in series, parallel, or a combination thereof to constitute the fuel reformer that is a part of a fuel reforming system.

Figure 7:
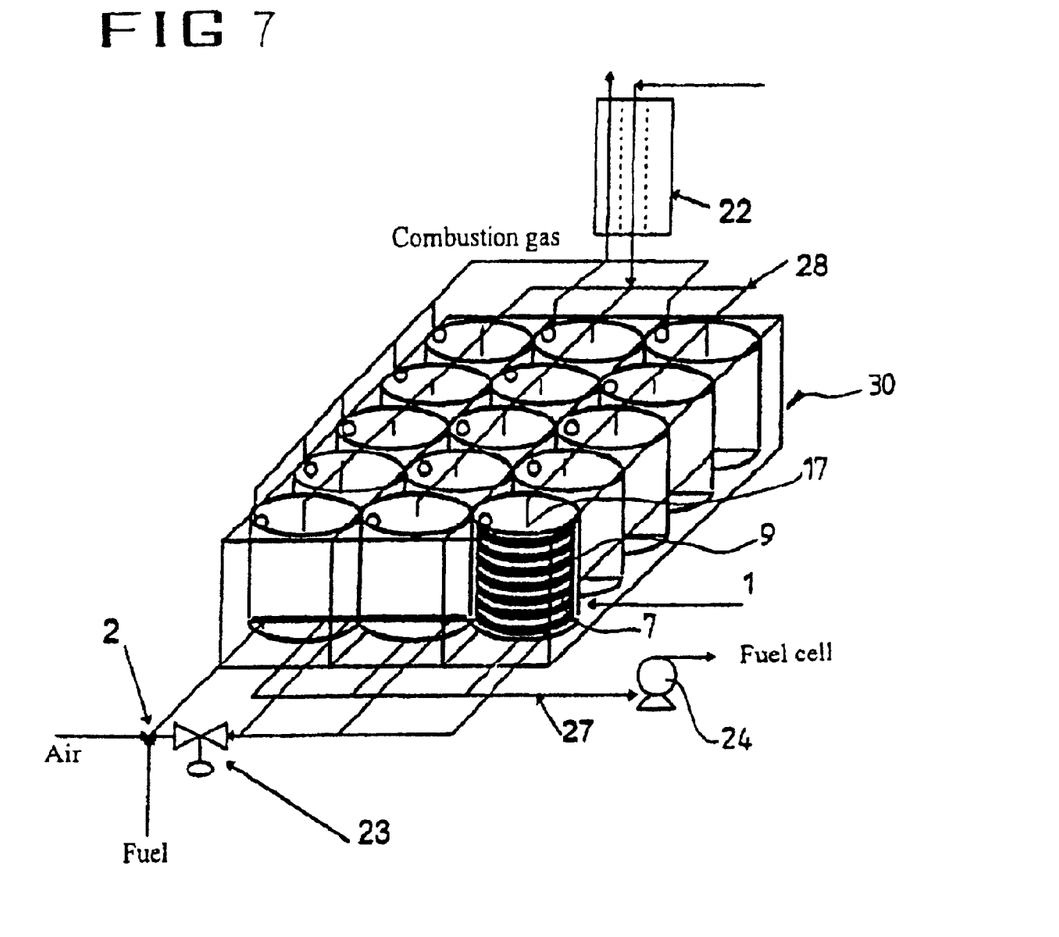
FIG. 7 shows a fuel reformer system according to the present invention.

Hereinafter, the operation of the fuel reforming system using the fuel reformer of the invention will be described with reference to FIG. 7.

The fuel reforming system according to the invention comprises a fuel preheater 22 for preheating a liquid fuel, such as methanol, etc., a fuel reformer 30 in which a plurality of unit modules 1 are connected with each other in series, parallel, or a combination thereof, and a pressure controller 24 for controlling pressure of a permeate, that is, hydrogen discharged from the unit modules. The fuel reforming system also includes a raffinate pressure controller 23 for controlling the pressure of hydrogen separation reaction chambers 7 of the respective unit modules 1, a fuel supply header 28 for supplying the liquid fuel to the respective unit modules 1, a permeate header 27 for collecting a permeate discharged from the hydrogen separation reaction chamber 7 of each unit module, and a valve 2. Valve 2 supplies fuel which does not permeate through metal films 11 in the unit modules to a combustion catalyst chamber in the respective unit modules.

In the fuel reforming system, the fuel, such as methanol, etc., is vaporized in the fuel preheater 22 comprising a fuel injector or a heat exchanger, and is passed to the fuel supply header 28. Thereafter, the fuel is passed through a fuel inlet 17 formed on the top wall of the inner housing arranged in the respective unit modules 1. The fuel is then introduced into the hydrogen separation reaction chamber 7 in which the fuel is simultaneously subjected to fuel reforming and the hydrogen separation reactions.

The permeate generated by the above reactions is again collected in the permeate header 27 and supplied to an anode of the fuel cell stack. The pressure controlling device 24, which is composed of a compressor or a pressure controlling valve, is disposed on the permeate header 27, such that, as occasion demands, the permeate pressure is controlled depending on the operating pressure of the fuel cell stack.

The pressure of the hydrogen separation reaction chamber is controlled by the pressure controller. The raffinate is passed through the pressure controller 23 to drop its pressure to an atmospheric pressure. Thereafter, the raffinate is passed to the valve 2. As occasion demands, the raffinate is passed from the valve 2 to the combustion catalyst chamber 9 to be utilized as the fuel. This greatly increases the energy efficiency of the fuel reformer.

Furthermore, when a heat exchanger is used as the fuel preheater 22, the heat supplied to the fuel preheater is heat-exchanged with the combustion gas discharged from the combustion catalyst chamber 9. This increases the energy efficiency.

Additionally, as described above, the fuel reformer 30 has a construction capable of controlling the hydrogen production rate, in that the unit modules are simply connected with each other in series, parallel, or a combination thereof, depending on the amount of hydrogen required for the fuel cell stack. Thus, the fuel reformer is suitable for mass production.

The fuel reformer of the invention has been shown as corresponding to a hydrogen generation and supply apparatus the reformer may be also applied to various applications which include devices requiring hydrogen generation and purification from mixed hydrogen containing gases, particularly in the production of high purity hydrogen.

In particular, the fuel reformer of the invention utilizes the property of palladium-based metal film which selectively separates hydrogen from fuel to markedly reduce the CO concentration in a hydrogen fuel supplied to an SPEFC anode. This reduces anode poisoning by CO, and also enables the production of the proper amount of hydrogen from the respective unit modules. In addition, the fuel reformer is essentially composed of a plurality of the unit modules connected simply with each other in series, parallel, or a combination thereof. The fuel reformer has a construction adapted for mass production, and therefore may supply various capacities of hydrogen required by a fuel cell driven vehicles.

When the inventive miniature fuel reformer using a metal thin film is applied to a fuel cell driven vehicle, the hydrogen production reaction (such as the steam reforming reaction) and the hydrogen separation reaction are carried out in the same reactor. As a result, the fuel reformer may supply, to an anode of the fuel cell, highly pure hydrogen having a remarkably low carbon monoxide concentration, without requiring a separate apparatus for hydrogen separation. This results in a decrease in anode poisoning by carbon monoxide. This also results in a remarkable decrease in the size of the fuel reformer, to allow the fuel reformer to easily mount in the vehicle. The fuel reformer is fabricated with a unit module having certain hydrogen production capacity, to supply varied amounts of hydrogen required by a fuel cell driven vehicle. This is possible with a simple module assembly, thereby yielding an efficient increase in the assembly productivity for mass production.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A miniature fuel reformer for use in a fuel cell driven vehicle comprising a plurality of unit modules connected with each other in series, parallel, or a combination thereof, each of the unit modules including:

an inner housing having a cylindrical shape and top and bottom walls;

an outer housing arranged around the inner housing and radially spaced from the inner housing;

a hydrogen separation reaction chamber defined by the inner housing;

a combustion catalyst chamber defined between the inner and outer housings and containing a combustion catalyst for supplying heat needed in the inner housing;

a fuel inlet provided at the top wall of the inner housing and adapted to introduce liquid fuel into the hydrogen separation reaction chamber;

a plurality of vertically spaced hydrogen gas separation cells arranged in the hydrogen separation reaction chamber and comprising a pair of spaced metal films adapted to selectively permeate hydrogen contained in the fuel introduced in the hydrogen separation reaction chamber, thereby separating the hydrogen from the fuel;

a steam reforming catalyst filled in the hydrogen separation reaction chamber between adjacent hydrogen gas separating cells, said reforming catalyst adapted to reform the fuel introduced in the hydrogen separation reaction chamber;

a plurality of vertically spaced cylindrical support members centrally arranged in the hydrogen separation reaction chamber and defining a hydrogen passage communicating with the hydrogen separating cells, thereby allowing the hydrogen separated from the fuel to be discharged from the hydrogen separation cells, each of the cylindrical support members being interposed between adjacent hydrogen gas separation cells and serving to regulate a gap defined between the adjacent hydrogen gas separation cells;

a permeate discharge tube coupled to the bottom wall of the inner housing, the permeate discharge tube communicating with the hydrogen passage defined by the cylindrical support members to allow the hydrogen introduced in the hydrogen passage to be outwardly discharged from the hydrogen passage;

a plurality of raffinate outlets provided at the bottom wall of the inner housing and adapted to discharge a portion of the fuel, not permeating through any one of the hydrogen gas separation cells, from the hydrogen separation reaction chamber; and a plurality of combustion fuel/air inlets respectively connected to the raffinate outlets by conduits and adapted to introduce the fuel portion discharged from the raffinate outlets into the combustion catalyst chamber, along with air, so that the fuel portion is burned in the combustion catalyst chamber.

2. The miniature fuel reformer of claim 1 wherein each of the hydrogen gas separation cells comprises:

an annular support plate interposed between the metal films and attached to the metal films at opposite surfaces thereof, the support plate having at least one fuel channel at a portion thereof;

a support layer interposed between the metal films inside the support plate and adapted to provide a structural stability for the metal films to withstand a high pressure, the support layer having a porous separation film structure to provide a passage for the hydrogen introduced into the interior of the hydrogen gas separation cell defined between the metal films; and a central support disk arranged inside the support layer in such a fashion that it is vertically aligned with the cylindrical support members, the central support disk having at least one radial hole communicating with the hydrogen passage provided by the support layer and with the hydrogen passage defined by the cylindrical support members, thereby serving as a permeate passage.

3. The miniature fuel reformer of claim 1 wherein the steam reforming catalyst contains at least one metal component selected from the group consisting of Cu, Zn, Fe, Cr, Ti, and Ni, or contains at least one precious metal in the amount of at least 0.01% by weight based on the weight of the catalyst.

4. The miniature fuel reformer of claim 2 wherein the respective metal films is are made of a palladium-based alloy or a metal foil coated with palladium.

5. The miniature fuel reformer of claim 2 wherein the support plate and the metal films, and the central support disk and the metal films, respectively, are attached to each other a diffusion welding.

6. The miniature fuel reformer of claim 2 wherein the hydrogen gas separation cells are arranged in the hydrogen separation reaction chamber such that the fuel channels are located in a zigzag pattern, whereby a contact efficiency between the fuel and the steam reforming catalyst, and contact efficiency between the reforming gas and the metal films, is increased.

7. The miniature fuel reformer of claim 1 wherein the respective cylindrical support members are fixed to the hydrogen gas separation cells by diffusion welding.

* * * * *